(12) United States Patent
Akerblom

(10) Patent No.: US 6,988,424 B2
(45) Date of Patent: Jan. 24, 2006

(54) METHOD AND ARRANGEMENT FOR POSITIONING A SENSOR HEAD FOR MEASURING WHILE OBJECT IS MOVING

(75) Inventor: Bengt Akerblom, Varby (SE)

(73) Assignee: Daprox AB, Skarholmen (SE)

( * ) Notice: Subject to any disclaimer, the term of this patent is extended or adjusted under 35 U.S.C. 154(b) by 176 days.

(21) Appl. No.: 10/466,675

(22) PCT Filed: Jan. 23, 2002

(86) PCT No.: PCT/SE02/00108

§ 371 (c)(1),
(2), (4) Date: Jul. 21, 2003

(87) PCT Pub. No.: WO02/061369

PCT Pub. Date: Aug. 8, 2002

(65) Prior Publication Data

US 2004/0045381 A1    Mar. 11, 2004

(30) Foreign Application Priority Data

Jan. 23, 2001  (SE) .................................. 0100181

(51) Int. Cl.
G01B 13/00 (2006.01)
G01B 13/06 (2006.01)
G01B 121/04 (2006.01)
G01B 21/08 (2006.01)
G01D 3/08 (2006.01)

(52) U.S. Cl. .................................... 73/866.5
(58) Field of Classification Search ........ 73/37.5–37.7, 73/866.5, 159; 324/206, 229–231
See application file for complete search history.

(56) References Cited

U.S. PATENT DOCUMENTS

| | | | | | |
|---|---|---|---|---|---|
| 2,832,217 A | * | 4/1958 | Hamren | .................... | 73/170.02 |
| 2,954,521 A | * | 9/1960 | McKee | ...................... | 324/72.5 |
| 4,325,249 A | * | 4/1982 | Berglund | .................... | 73/37.6 |
| 4,647,855 A | * | 3/1987 | Berglund | ................. | 73/37.7 X |
| 4,912,410 A | * | 3/1990 | Morley | ........................ | 324/230 |
| 5,824,901 A | * | 10/1998 | van Seeters | ............. | 73/514.32 |
| 5,865,059 A | * | 2/1999 | Alessandro | .................. | 73/159 |
| 6,318,153 B1 | * | 11/2001 | Dumberger et al. | ......... | 73/37.6 |

FOREIGN PATENT DOCUMENTS

| | | | |
|---|---|---|---|
| DE | 19632385 A1 | * | 3/1997 |
| EP | 524218 B1 | * | 10/1994 |
| EP | 811826 A2 | * | 12/1997 |
| SE | 415 801 | | 7/1980 |
| SE | 434 997 | | 7/1984 |
| SE | 515 644 | | 7/2001 |

* cited by examiner

Primary Examiner—Thomas P. Noland
(74) Attorney, Agent, or Firm—Young & Thompson

(57) ABSTRACT

During measurement by means of a measurement arrangement (4) in which a sensor head (7) is axially movable in a sensor housing (6) and is intended, in the measurement position, to rest against a measured object (2) via an air cushion, the orientation of the sensor head in the sensor housing is monitored. When the orientation of the sensor housing deviates by a predetermined value from the normal, the measurement arrangement is temporarily moved a distance away from the measured object and is then returned to the measurement position again for continued measurement, with the sensor head now in the normal position relative to the sensor housing. In such a measurement arrangement, a monitoring device (24) is provided to automatically produce the stated movement of the measurement arrangement.

8 Claims, 2 Drawing Sheets

METHOD AND ARRANGEMENT FOR POSITIONING A SENSOR HEAD FOR MEASURING WHILE OBJECT IS MOVING

The present invention relates to a method for measurement, according to the pre-characterizing clause of patent claim 1, and to an arrangement for measurement, according to the pre-characterizing clause of patent claim 5.

PRIOR ART

In many situations involving the measurement of, for example, material thicknesses, a type of measurement equipment is used in which a sensor head is movably mounted in a sensor housing and in which the sensor head is held at a certain distance from a measured object by means of air which is blown out between the sensor head and the measured object and there forms an air cushion. By means of such an air cushion, the gap between sensor head and measured object can be kept small and constant, which is of advantage for measurement precision.

However, as regards measurement precision, it is also important that the sensor head can move easily in the sensor housing, which is normally mounted in a fixed manner. By means of an air-type bearing, it is possible for the sensor head to be made easily movable in the axial direction in the sensor housing, so that it can adapt its position to the actual thickness of the measured object.

During control measurement of the thickness of a material web running across a roller, it is desirable to be able to move the measurement equipment backward and forward along the roller in order to effect continuous measurement. Any irregularities on the material web can in this case result in the sensor head being set at an inclination and no longer being able to move entirely freely in the axial direction. The measurement result may consequently be incorrect, possibly without this being noticed. In addition, as a result of being locked in an inclined position, the sensor head may be subjected to considerable wear and tear against the material web. Another problem is that of being able to rectify the error before too much damage has occurred on account of omitted measurement control and sensor wear.

OBJECT OF THE INVENTION

The aim of the invention is to make it possible to avoid the above-mentioned problems and to achieve improved reliability and increased measurement precision. Another aim is to do this by simple means.

DISCLOSURE OF THE INVENTION

The object of the invention is achieved on the one hand by means of a method having the features set out in patent claim 1, and on the other hand by means of a measurement arrangement having the features set out in patent claim 5.

By detecting the position of inclination of the sensor head relative to the sensor housing and—if there is an indication of excessive inclination and resulting difficulty of movement of the sensor head—by initiating a displacement and a subsequent repositioning of the measurement arrangement, it is possible in a simple way to restore full mobility to the sensor head. A control arrangement in the measurement arrangement effects continuous monitoring to ensure that the sensor head has the necessary mobility in the sensor housing, and it can automatically warn of an error and correct the error. The extra equipment which is needed in the measurement arrangement can be made simple and reliable.

Further features and advantages of the invention are set out in the following description and in the patent claims.

The invention is described in more detail below on the basis of an illustrative embodiment which is shown on the attached drawing.

DESCRIPTION OF ILLUSTRATIVE EMBODIMENTS

Figure 1:
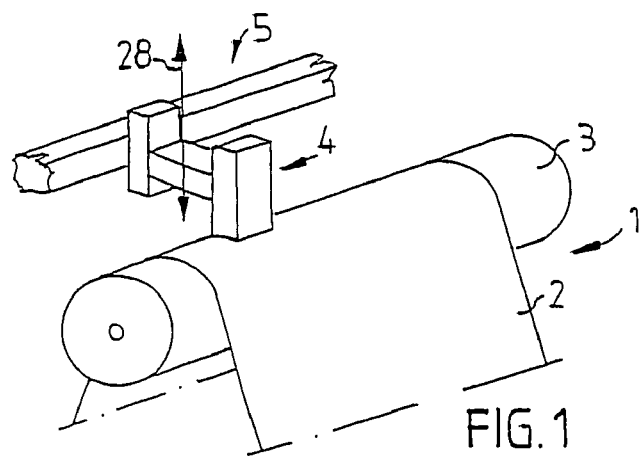
FIG. 1 shows a schematic view of a measurement station with a measurement arrangement according to the invention.

At a measurement station 1 shown in FIG. 1, a material web 2, for example in the form of a newly rolled sheet of metal, is guided across a roller 3. To measure the thickness of the material web 3, a measurement arrangement 4 according to the invention is mounted so as to move backward and forward along the roller 3 in a frame 5.

Figure 2:
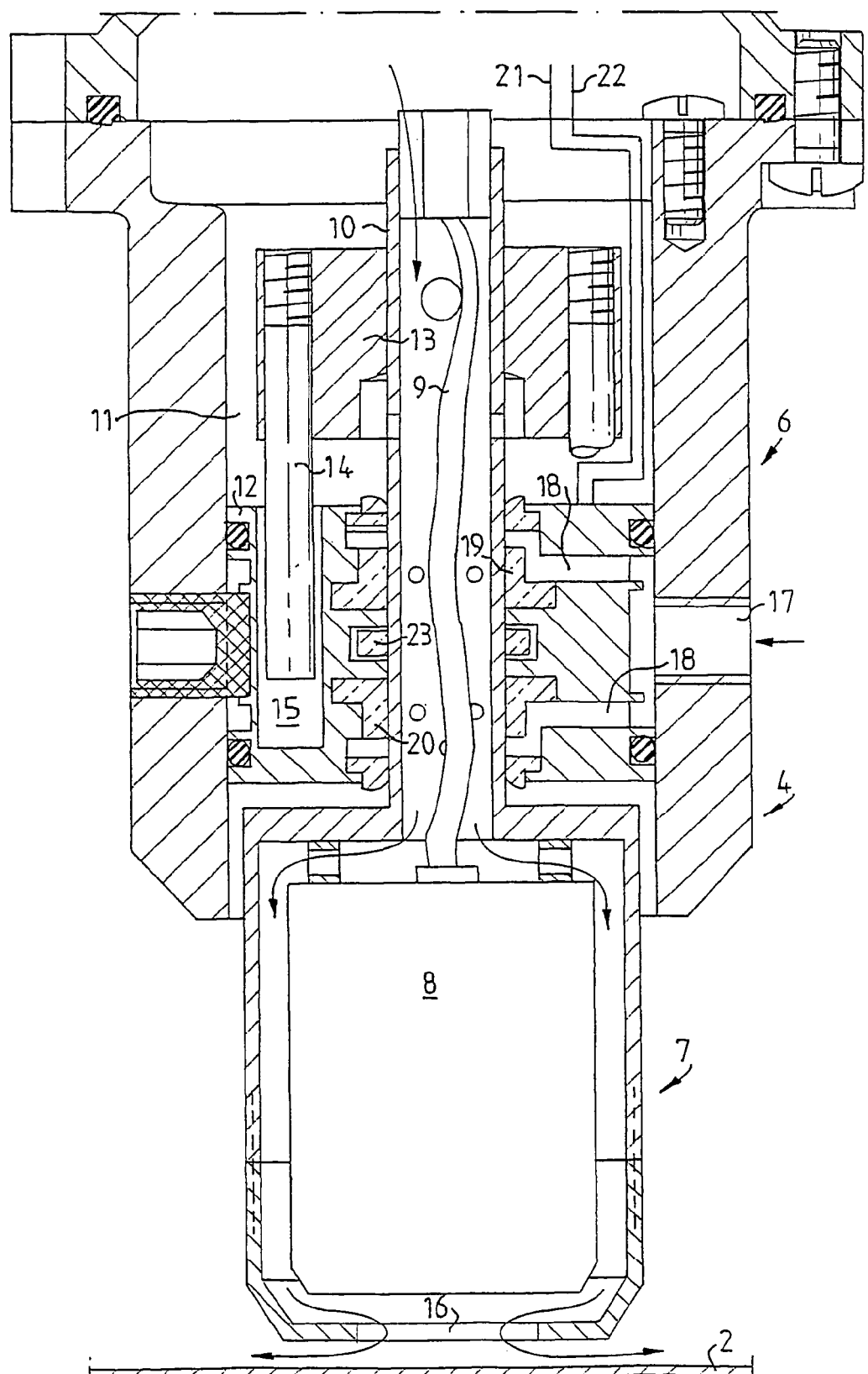
FIG. 2 shows a partial cross section through a measurement arrangement according to the invention.

As can be seen more clearly from FIG. 2, the measurement arrangement 4 includes a sensor housing 6 and a sensor head 7 which is arranged movably in the latter, a sensor 8 being connected in a conventional manner via an arrangement of wires 9 to a measurement apparatus (not shown here). The sensor head 7 is provided with a tubular shaft 10 which runs through a control part 12 which is fixed in a bore 11 in the sensor housing 6 and which is sealed tight. Mounted on top of the shaft 10 is a body 13 in which control elements 14 are secured. These control elements 14 have their free ends in recesses 15 in the control part 12 and in this way prevent mutual turning between the sensor head 7 and the control part 12. Compressed air is fed into the top of the sensor housing and can flow through the inside of the shaft 10 and out through an opening 16 at the bottom of the sensor housing 7 in order to form an air cushion against the material web 2, as is indicated by arrows.

The shaft 10 on the sensor head 7 can move easily in the control part 12 by virtue of air-type bearing. For this purpose, compressed air is conveyed via an attachment 17 in the sensor housing 6 and is fed via channels 18 in the control part 12 to the central hole in the control part 12 in which the shaft 10 runs with a certain play. Mounted at an axial distance from each other in the control part 12 are two annular contact elements 19, 20 which serve as a guide for the shaft 10 and which are connected each to a line 21, 22. Between the two contact elements 19, 20 in the control part 12 there is an annular damping member 23 which surrounds the shaft 10 and acts on the flow of air along the outside thereof.

Figure 3:
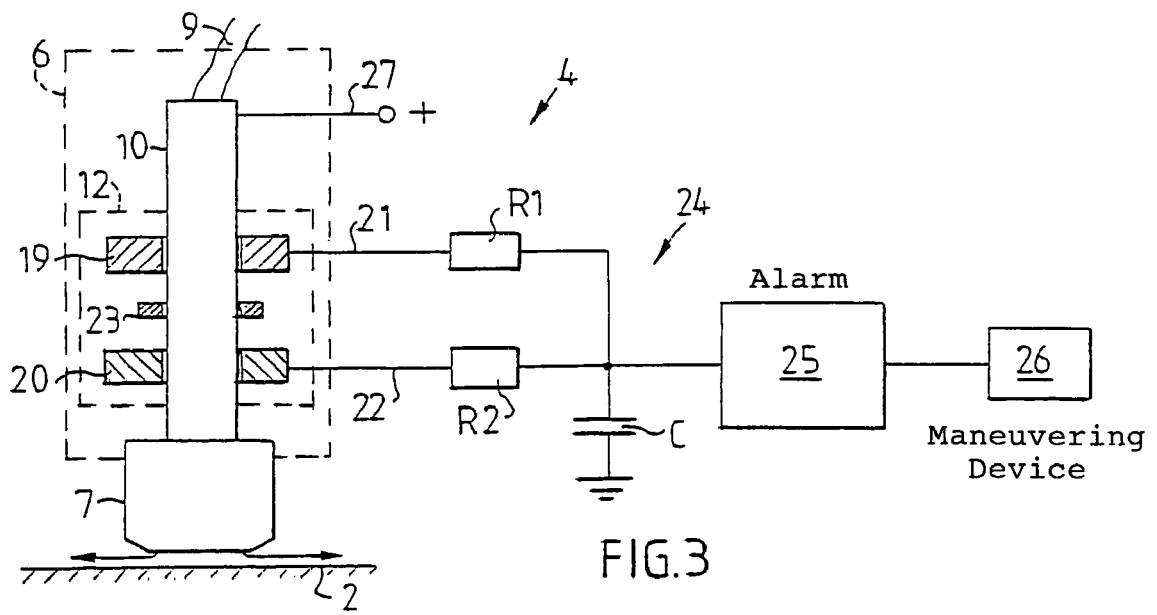
FIG. 3 shows a circuit diagram of a measurement arrangement according to the invention.

As can be seen more clearly from FIG. 3, the two contact elements 19, 20 form, together with a number of other components, a monitoring device 24 included in the measurement arrangement 4. The contact elements 19, 20 are connected in parallel via lines 21 and 22, respectively, and their respective resistors R1 and R2, to the input of an alarm mechanism 25 which in turn is connected to a maneuvering device 26. The input of the alarm mechanism 25 is also connected to earth via a capacitor C. The shaft 10 which is electrically conductive at least on the outside is connected via a line 27 to the positive pole of a voltage source.

Figure 4:
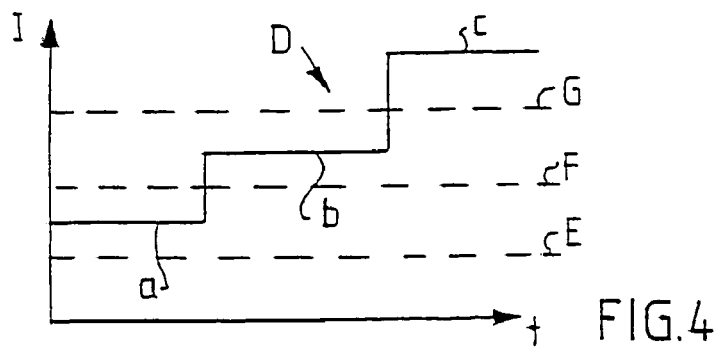
FIG. 4 shows a diagram of the output signal from a monitoring device.

The shaft 10 normally runs free from the two contact elements 19, 20 in the control part 12 and can therefore easily change its height position relative to the material web 2. When the sensor head 7 is exposed to a lateral force, for example as a result of an irregularity in the material web 2, the shaft 10 can be inclined so far that its ability to move is limited or ceases. It may then come into contact with the lower contact element 20, or possibly the upper contact element 19, if the inclination is limited, or in contact with both contact elements 19, 20 if the inclination is greater. As a result of such contact, current flows to the alarm 25, the current strength I being a function of how strong the inclination is. An example of what can happen is shown in FIG. 4 where a curve D shows how the current strength I can vary as a function of the time t. The curve portion a represents contact only with the lower contact element 20, while the curve portion b represents contact only with the upper contact element 19, and the curve portion c represents contact with both contact elements 19, 20, i.e. a strong degree of inclination. The horizontal lines E, F and G indicate different alarm levels for the degree of inclination.

At the lower level E, when the shaft 10 is not in contact with any of the contact elements 19, 20, everything functions as normal. At the intermediate level F, an inclination has taken place which is of such a degree that an alarm signal is emitted in order to indicate that the situation is abnormal, for example by triggering of a warning light. At the uppermost level G, the inclination has become so great that the function of the equipment is jeopardized, for which reason the maneuvering device 26 is activated to move the whole measurement arrangement 4 away from the material web 2 and thereby remove the cause of the inclination. Thereafter, the measurement arrangement 4 is returned automatically to the measurement position against the material web 2, and the sensor head 7 resumes its normal measuring position against the material web 2, without inclination of the shaft 10 and with the alarm signal deactivated. Such a movement is shown diagrammatically by the double arrow 28 in FIG. 1.

By not immediately moving the measurement arrangement 4 away in the event of a small inclination, it is possible to allow a minimal disturbance on the material web to pass without taking any steps. Only when a greater disturbance occurs is the measurement arrangement automatically moved away in order to prevent damage and wear of the equipment. It is of course possible to select levels for different steps in some other way than that indicated here, depending on which conditions and requirements apply.

In the example chosen here, the resistance at the resistor R2 is expediently twice as great as the resistance at the resistor R1, for example 200 ohm and 100 ohm respectively, but other values can also be chosen, and the resistance at the resistor R2 can also be less than the resistance at the resistor R1, depending on the aims and requirements.

With the diameter of the shaft 10 being up to ca. 8.00 mm, the internal diameter of the contact elements 19, 20 is expediently up to ca. 8.15 mm, giving a relatively small gap between shaft and contact element in order to achieve a high degree of precision in the shaft movement. Additionally providing a good fit between the shaft 10 and the damping member 23 ensures that the air introduced into the control part 12 has an advantageous flow around the shaft 10, so that the sensor head 7 is held in a stable and substantially vibration-free measurement position. At the stated diameter of ca. 8.00 mm of the shaft 10, the internal diameter of the damping member 23 can expediently be up to ca. 8.03 mm, but other values can of course be chosen in order to give other values for the gap size and thereby achieve a desired behavior of the sensor head 7.

To make it easier to mount the contact elements 19, 20 and the damping member 23 in the control element 12, said control element can expediently be designed in parts, preferably made of electrically nonconductive material. The contact elements 19, 20 and the shaft 10 are made of electrically conductive material, at least on those surfaces which are facing toward each other and are intended to be able to come into contact with each other. The sensor head 7 is normally oriented vertically, but, by suitable design of the measurement arrangement 4, other orientations are also possible. The stated movement of the measurement arrangement in the event of a considerable inclination of the sensor head in such cases naturally takes place in the normal direction of movement of the measurement head.

The sensor 8 included in the measurement arrangement 4 can preferably work in accordance with the reluctance principle, but it is of course possible to use other types of sensors.

What is claimed is:

1. A method for measurement by means of a measurement arrangement (4) in which a sensor head (7) is axially movable in a sensor housing (6) and is intended, in the measurement position, to rest against a measured object (2) via an air cushion, characterized in that the inclination of the sensor head (7) in the sensor housing (6) is monitored, and in that, when the inclination of the sensor head in the sensor housing reaches a predetermined value the measurement arrangement (4) is temporarily moved a distance away from the measured object and is thereafter returned to the measurement position relative to the measured object for continued measurement, with the sensor head in the normal measuring position relative to the sensor housing, and in that the inclination of the sensor head (7) is represented by an electrical signal generated upon contact between sensor head and sensor housing.

2. The method as claimed in claim 1, characterized in that the electrical signal is generated using two contact elements (19, 20) against the sensor housing which are separated from each other in the axial direction of the sensor housing.

3. A measurement arrangement in which a sensor head (7) is axially movable in a sensor housing (6) and projects axially out from the latter in order to rest against a measured object (2) via an air cushion, the sensor housing being designed to supply compressed air for holding the sensor head in the sensor housing and for forming the air cushion, characterized in that the measurement arrangement includes a monitoring device (24) for monitoring the inclination of the sensor head (7) relative to the sensor housing (6), in that the monitoring device is configured in such a way that, when the inclination of the sensor head relative to the sensor housing reaches a predetermined value during measurement, it activates a maneuvering device (26) for temporarily moving the measurement arrangement a distance away from the measured object and thereafter returning the measurement arrangement to the measurement position relative to the measured object for continued measurement, with the sensor head in the normal measuring position relative to the sensor housing, and in that the monitoring device (24) includes at least two contact elements (19, 20) mounted at a distance from each other in the sensor housing (6) and cooperating with the outside of a portion (10) of the sensor head (7) projecting into the sensor housing.

4. The measurement arrangement as claimed in claim 3, characterized in that the contact elements (19, 20) are annular, for cooperation with a cylindrical shaft (10) on the sensor housing (7).

5. The measurement arrangement as claimed in claim 4, characterized in that the contact elements (19, 20) are connected electrically to an alarm mechanism (25) which, at a predetermined signal level resulting from contact between the contact elements (19, 20) and the shaft (10) on the sensor head (7), is designed to send a maneuver signal to the maneuvering device (26).

6. The measurement arrangement as claimed in claim 5, characterized in that the contact elements (19, 20) are connected in parallel to the alarm mechanism (25).

7. The measurement arrangement as claimed in claim 6, characterized in that the contact elements (19, 20) are connected each via its resistor (R1, R2), of which one has a greater resistance than the other.

8. The measurement arrangement as claimed in claim 3, characterized in that the contact elements (19, 20) are mounted axially separate from each other in a control part (12) in which the sensor head is mounted and via which air for supporting the sensor head (7) is supplied.

* * * * *